United States Patent
Li et al.

(10) Patent No.: US 11,984,028 B2
(45) Date of Patent: May 14, 2024

(54) METHOD, DEVICE AND ELECTRONIC EQUIPMENT FOR VEHICLE COOPERATIVE DECISION-MAKING AND COMPUTER STORAGE MEDIUM

(71) Applicants: China Intelligent and Connected Vehicles (Beijing) Research Institute Co., Ltd, Beijing (CN); Tsinghua University, Beijing (CN)

(72) Inventors: Keqiang Li, Beijing (CN); Wenbo Chu, Beijing (CN); Qiuchi Xiong, Beijing (CN); Qiqige Wuniri, Beijing (CN); Guanfu Huang, Beijing (CN); Xiaoping Du, Beijing (CN)

(73) Assignees: China Intelligent and Connected Vehicles (Beijing) Research Institute Co., Ltd, Beijing (CN); Tsinghua University, Beijing (CN)

( * ) Notice: Subject to any disclaimer, the term of this patent is extended or adjusted under 35 U.S.C. 154(b) by 282 days.

(21) Appl. No.: 17/623,550

(22) PCT Filed: May 27, 2021

(86) PCT No.: PCT/CN2021/096316
§ 371 (c)(1),
(2) Date: Dec. 28, 2021

(87) PCT Pub. No.: WO2022/121247
PCT Pub. Date: Jun. 16, 2022

(65) Prior Publication Data
US 2023/0252895 A1     Aug. 10, 2023

(30) Foreign Application Priority Data
Dec. 11, 2020 (CN) .......................... 202011439868.3

(51) Int. Cl.
G08G 1/0967 (2006.01)
G06V 20/54 (2022.01)
G08G 1/0968 (2006.01)

(52) U.S. Cl.
CPC ....... G08G 1/096725 (2013.01); G06V 20/54 (2022.01); G08G 1/096811 (2013.01)

(58) Field of Classification Search
CPC ....... G08G 1/0967; H04W 4/44; G06V 20/54; H04L 29/08
See application file for complete search history.

(56) References Cited

U.S. PATENT DOCUMENTS

| | | | |
|---|---|---|---|
| 11,715,377 B2 * | 8/2023 | Chen | B60W 30/18163 701/117 |
| 2006/0142933 A1 * | 6/2006 | Feng | G08G 1/096861 701/117 |

(Continued)

FOREIGN PATENT DOCUMENTS

| | | |
|---|---|---|
| CN | 105225500 A | 1/2016 |
| CN | 107272687 A | 10/2017 |

(Continued)

OTHER PUBLICATIONS

Office Action dated Aug. 23, 2021 for Chinese Application No. 202011439868.3.

(Continued)

*Primary Examiner* — Tan Q Nguyen

(57) ABSTRACT

The application provides a method, device, electronic device for vehicle cooperative decision-making as well as a computer storage medium. The method for vehicle cooperative decision-making applied at a cloud server includes: receiving a cooperative decision request sent by a roadside device, wherein the cooperative decision request is a request sent by the roadside device after it is recognized that a road is congested based on acquired real-time road information;

(Continued)

acquiring information of a road scene included in the cooperative decision request; determining a congestion scene type based on the information of the road scene; calculating multi-vehicle oriented decision planning schemes using a preset scene cooperative decision model based on the congestion scene type; and sending the decision planning schemes to respective vehicles, so that the vehicles perform respective driving operations according to the decision planning schemes.

16 Claims, 3 Drawing Sheets

(56) References Cited

U.S. PATENT DOCUMENTS

| | | | | |
|---|---|---|---|---|
| 2013/0018705 | A1* | 1/2013 | Heath | G06Q 50/30 |
| | | | | 705/13 |
| 2017/0124579 | A1 | 5/2017 | Crabtree et al. | |
| 2023/0298468 | A1* | 9/2023 | Jha | H04W 4/46 |
| | | | | 701/117 |

FOREIGN PATENT DOCUMENTS

| | | | | |
|---|---|---|---|---|
| CN | 108109415 | * | 12/2017 | ........... G08G 1/0967 |
| CN | 108022435 | A | 5/2018 | |
| CN | 108109415 | A | 6/2018 | |
| CN | 110335488 | A | 10/2019 | |
| CN | 110603181 | A | 12/2019 | |
| CN | 105739534 | B | 2/2020 | |
| CN | 111432375 | A | 7/2020 | |
| CN | 111565423 | A | 8/2020 | |
| CN | 112614366 | A | 4/2021 | |
| JP | 2020064410 | A | 4/2020 | |

OTHER PUBLICATIONS

International Search Report dated Aug. 27, 2021 for Application No. PCT/CN2021/096316.

Rejection Decision dated Jun. 6, 2022 from National Intellectual Property Administration, PRC for application No. 202011439868.3.

The Second Office Action dated Feb. 25, 2022 from National Intellectual Property Administration, PRC for application No. 202011439868.3.

* cited by examiner

METHOD, DEVICE AND ELECTRONIC EQUIPMENT FOR VEHICLE COOPERATIVE DECISION-MAKING AND COMPUTER STORAGE MEDIUM

CROSS-REFERENCE TO RELATED APPLICATIONS

The application is a national stage of an international application No. PCT/CN2021/096316 file on May 27, 2021, which claims a priority of Chinese Patent Application No. 202011439868.3 filed in China on Dec. 11, 2020, both of which are incorporated herein by reference in their entireties.

TECHNICAL FIELD

The application refers to the field of intelligent transportation technology, and in particular relates to a method, a device, and an electronic device for vehicle cooperative decision-making as well as a computer storage medium.

BACKGROUND

Currently, a method for vehicle cooperative decision-making according to related arts primarily is that a vehicle uses image recognition to recognize driving intentions and vehicle conditions of the other nearby autonomous vehicles, which has time delay and inaccuracy and will cause lower road utilization and safety.

Therefore, it is a technical problem that needs to be solved urgently by those skilled in the art to find a way to improve road utilization and safety.

SUMMARY

The embodiments of the present application provide a method, a device and an electronic device for performing a vehicle cooperative decision-making, as well as a computer storage medium that can be used to improve road utilization and safety.

In a first aspect, the embodiments of the present application provide a method for vehicle cooperative decision-making. The method is applicable to a cloud server, and includes: receiving a cooperative decision request sent by a roadside device, wherein the cooperative decision request is a request sent by the roadside device after it is recognized that a road is congested based on acquired real-time road information; acquiring information of a road scene included in the cooperative decision request; determining a congestion scene type based on the information of the road scene; calculating multi-vehicle oriented decision planning schemes using a preset scene cooperative decision model based on the congestion scene type; and sending the decision planning schemes to respective vehicles, so that the vehicles perform respective driving operations according to the decision planning schemes.

In an embodiment, the calculation of the multi-vehicle oriented decision planning schemes using the preset scene cooperative decision model based on the congestion scene type may include: acquiring road restriction information and real-time vehicle state information corresponding to the congestion scene type; and calculating the multi-vehicle oriented decision planning schemes using the preset scene cooperative decision model based on the road restriction information and the real-time vehicle state information.

In an embodiment, the acquisition of the real-time vehicle state information may include: receiving at least one of vehicle speed, acceleration, angular velocity, wheel steering, braking information, a relative distance to a leading/following vehicle, destination information, and a ratio of traveled path to planned path sent by each of the vehicle.

In an embodiment, the acquisition of the real-time vehicle state information may include: receiving at least one of traffic light state information, relative sequence information of the vehicles, and location information of a pedestrian in the road scene sent by the roadside device.

In an embodiment, the road restriction information may include allowable vehicle speed range, number of lanes, lane width, and available road sections.

In an embodiment, the preset scene cooperative decision model may be a time slot allocation model designed based on a game theory matching method.

In an embodiment, the decision planning schemes may include at least one of a driving priority distribution scheme, a vehicle path change scheme, and a vehicle next-state driving operation scheme.

In a second aspect, the embodiments of the present application provide a device for vehicle cooperative decision-making. The method is applicable to a cloud server, and includes: a reception module configured to receive a cooperative decision request sent by a roadside device, wherein the cooperative decision request is a request sent by the roadside device after it is recognized that a road is congested based on acquired real-time road information; an acquisition module configured to acquire information of a road scene included in the cooperative decision request; a recognition module configured to recognize a congestion scene type based on the information of road scene; a calculation module configured to calculate multi-vehicle oriented decision planning schemes using a preset scene cooperative decision model based on the congestion scene type; and a sending module configured to send the decision planning schemes to respective vehicles, so that the vehicles perform respective driving operations according to the decision planning schemes.

In an embodiment, the calculation module may include: an acquisition unit configured to acquire road restriction information and real-time vehicle state information corresponding to the congestion scene type; and a calculation unit configured to calculate the multi-vehicle oriented decision planning schemes using the preset scene cooperative decision model based on the road restriction information and the real-time vehicle state information.

In an embodiment, the acquisition unit may include: a first reception subunit configured to receive at least one of vehicle speed, acceleration, angular velocity, wheel steering, braking information, a relative distance to a leading/following vehicle, destination information, and a ratio of traveled path to planned path sent by each of the vehicle.

In an embodiment, the acquisition unit may include: a second reception subunit configured to receive at least one of traffic light state information, relative sequence information of the vehicles, and location information of a pedestrian in the road scene sent by the roadside device.

In an embodiment, the road restriction information may include allowable vehicle speed range, number of lanes, lane width, and available road sections.

In an embodiment, the preset scene cooperative decision model may be a time slot allocation model designed based on a game theory matching method.

In an embodiment, the decision planning schemes may include at least one of a driving priority distribution scheme, a vehicle path change scheme, and a vehicle next-state driving operation scheme.

In a third aspect, the embodiments of the present application provide an electric device for vehicle cooperative decision-making. The electric device includes: a processor; and a memory storing computer program instructions, wherein the processor is configured to execute the computer program instructions to perform the method for vehicle cooperative decision-making according to the first aspect.

In a fourth aspect, the embodiments of the present application provides a computer storage medium with computer program instructions stored thereon, the computer program instructions, when executed by a processor, cause the processor to perform the method for vehicle cooperative decision-making according to the first aspect.

BRIEF DESCRIPTION OF THE DRAWINGS

In order to explain technical solutions of the embodiments of the present application more clearly, the drawings that need to be used in the embodiments of the present application will be briefly discussed below. For those skilled in the art, other drawings can be obtained from these drawings without inventive efforts.

DETAILED DESCRIPTION

The features and exemplary embodiments of various aspects of the present application will be described in detail below. In order to make the purpose, technical solutions, and advantages of the present application clearer, the present application will be described in detail with reference to the accompanying drawings and specific embodiments. It should be understood that the specific embodiments described herein are only intended to explain the present application, but not to limit the application. For those skilled in the art, the present application can be implemented without some of these specific details. The following description of the embodiments is only to provide a better understanding of the present application by showing examples of the present application.

It should be noted that relational terms such as "first and second" herein are only used to distinguish one entity or operation from another entity or operation, and do not necessarily require or imply these entities or operations must have such actual relationship or order therebetween. Moreover, the terms "include", "comprise" or any other variants thereof are intended to cover non-exclusive inclusion, so that a process, method, article, or device including a series of elements may not only include those elements, but also include other elements that are not explicitly listed, or also include elements inherent to the process, method, article or device. Otherwise particularly stated, an element defined by the expression "including . . . " do not exclude existence of other same elements in a process, method, article, or device that includes the element.

Currently, a method for vehicle cooperative decision-making according to related arts primarily is that a vehicle uses image recognition to recognize driving intentions and vehicle conditions of the other nearby autonomous vehicles, which has time delay and inaccuracy and will cause lower road utilization and safety.

In order to solve the existing technical problems, the embodiments of the present application provide a method, device, electronic device for vehicle cooperative decision-making as well as computer storage medium. The method for vehicle cooperative decision-making according to the embodiments of the present application will be firstly discussed below.

Figure 1:
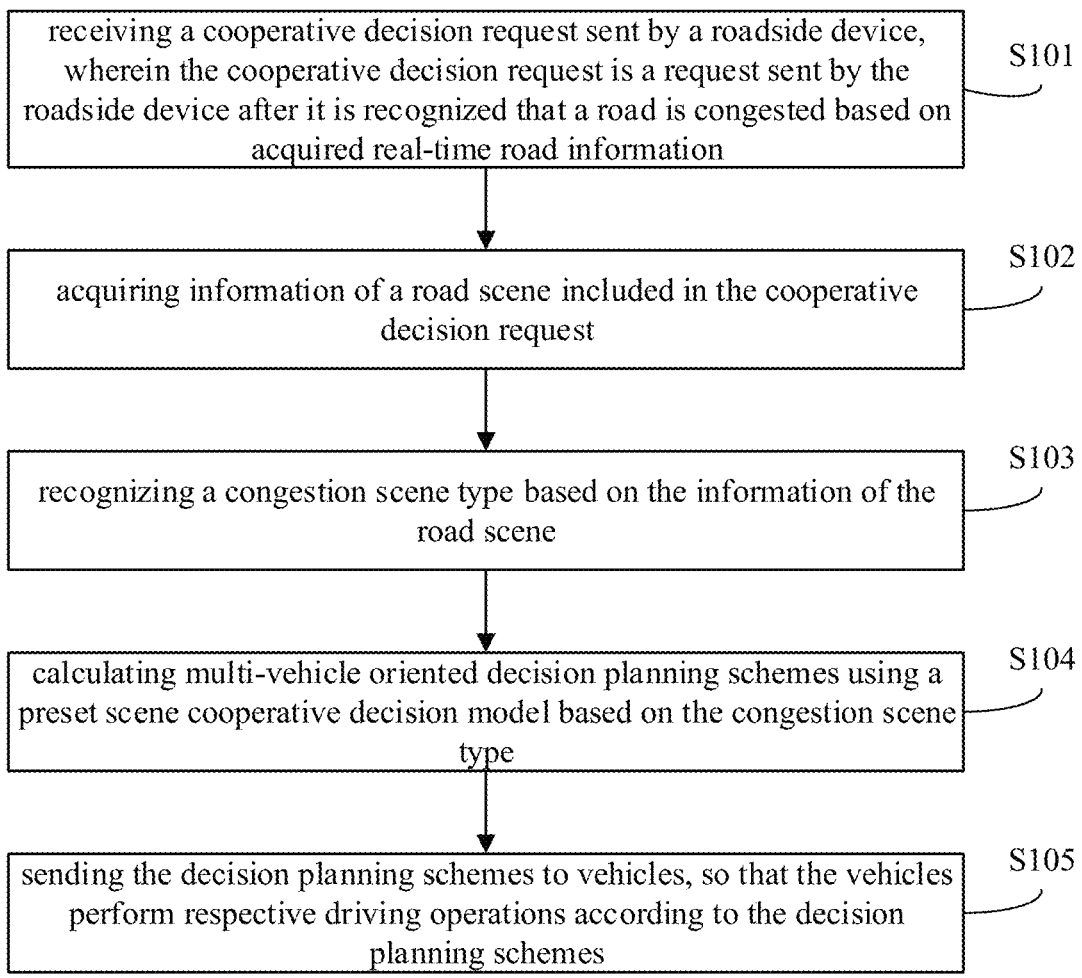
FIG. 1 is a schematic flowchart of a method vehicle cooperative decision-making according to an embodiment of the present application.

FIG. 1 shows a schematic flow chart of a method for vehicle cooperative decision-making according to an embodiment of the present application. As shown in FIG. 1, the method for vehicle cooperative decision-making is applied at a cloud server and includes:

S101: receiving a cooperative decision request sent by a roadside device, wherein the cooperative decision request is a request sent by the roadside device after it is recognized that a road is congested based on acquired real-time road information;

S102: acquiring information of a road scene included in the cooperative decision request;

S103: determining a congestion scene type based on the information of the road scene;

S104: calculating multi-vehicle oriented decision planning schemes using a preset scene cooperative decision model based on the congestion scene type; and S105: sending the decision planning schemes to respective vehicles, so that the vehicles perform respective driving operations according to the decision planning schemes.

In one embodiment, the calculation of the multi-vehicle oriented decision planning schemes using the preset scene cooperative decision model based on the congestion scene type may include:

acquiring road restriction information and real-time vehicle state information corresponding to the congestion scene type; and calculating the multi-vehicle oriented decision planning schemes using the preset scene cooperative decision model based on the road restriction information and the real-time vehicle state information.

In one embodiment, the acquisition of the real-time vehicle state information may include:

receiving at least one of vehicle speed, acceleration, angular velocity, wheel steering, braking information, a relative distance to a leading/following vehicle, destination information, and a ratio of traveled path to planned path sent by each of the vehicle.

In one embodiment, the acquisition of the real-time vehicle state information may include:

receiving at least one of traffic light state information, relative sequence information of the vehicles, and location information of a pedestrian in the road scene sent by the roadside device.

In one embodiment, the road restriction information comprises allowable vehicle speed range, number of lanes, lane width, and available road sections.

In one embodiment, the preset scene cooperative decision model is a time slot allocation model designed based on a game theory matching method.

In one embodiment, the decision planning schemes may include at least one of a driving priority distribution scheme, a vehicle path change scheme, and a vehicle next-state driving operation scheme.

The method for vehicle cooperative decision-making is applied at a cloud server, and includes: receiving a cooperative decision request sent by a roadside device, wherein the cooperative decision request is a request sent by the roadside device after it is recognized that a road is congested based on acquired real-time road information; acquiring information of a road scene included in the cooperative decision request; determining a congestion scene type based on the information of the road scene; calculating multi-vehicle oriented decision planning schemes using a preset scene cooperative decision model based on the congestion scene type; and sending the decision planning schemes to respective vehicles, so that the vehicles perform respective driving operations according to the decision planning schemes. It can be seen that the embodiments of the present application uses a cloud server to generate multi-vehicle oriented decision planning schemes, and send the decision planning schemes to respective vehicles, so that the vehicles perform respective driving operations according to the decision planning schemes, thereby road utilization and safety can be improved.

Figure 2:
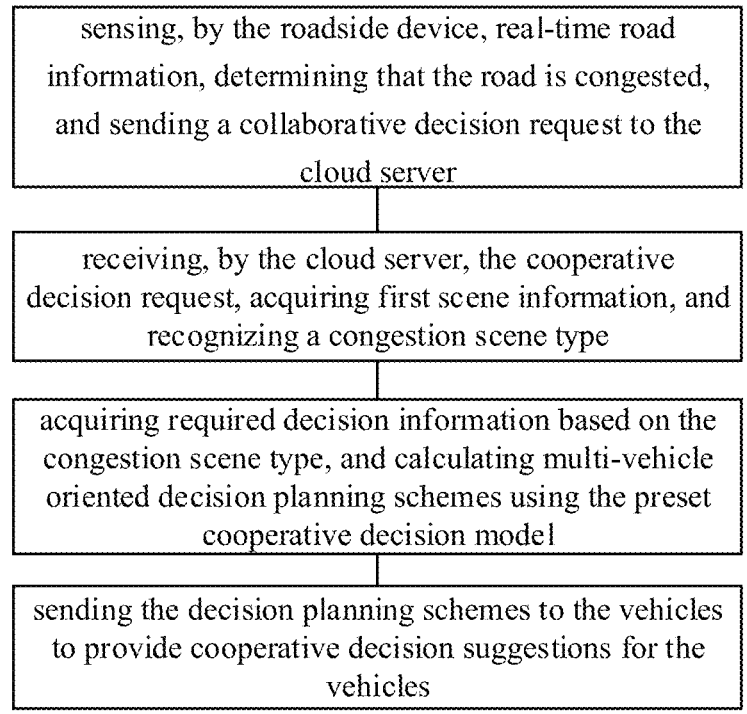
FIG. 2 is a schematic diagram of a process vehicle cooperative decision-making according to an embodiment of the present application.

FIG. 2 is a schematic diagram of a process of vehicle cooperative decision-making according to an embodiment of the present application. As shown in FIG. 2, the process of vehicle cooperative decision-making may include: sensing, by a roadside device, real-time road information, determining that the road is congested, and sending a cooperative decision request to a cloud server; receiving, by the cloud server, the cooperative decision request, acquiring first scene information, and determining congestion scene type; acquiring required decision information based on the congestion scene type, and calculating multi-vehicle oriented decision planning schemes by using a preset cooperative decision model; and sending the decision planning schemes to the vehicles to provide cooperative decision suggestions for the vehicles. Specifically, the process of vehicle cooperative decision-making may include the following steps.

1) The roadside device senses real-time road information, analyzes the real-time road information to recognize that the road is congested, and sends a cooperative decision request to the cloud server.

2) The cloud server receives the cooperative decision request, acquires first scene information, and analyzes a road model to designate a scene decision model for decision-making.

3) The scene decision model acquires road restriction information and real-time vehicle data, and calculates multi-vehicle oriented decision planning schemes based on the preset scene cooperative decision model.

3-1) The real-time vehicle data may include real-time vehicle state information obtained from vehicles, roadside devices and the cloud side. The information obtained from vehicle may include, but is not limited to, vehicle speed, acceleration, angular velocity, wheel steering, braking information, a relative distance to a leading/following vehicle, destination information, and a ratio of traveled path to planned path, etc., sent by each of vehicles within the scene to the cloud side. The information obtained from roadside devices may include, but not limited to, traffic light state information, relative sequence information of the vehicles, and location information of a pedestrian in the road scene, etc., sent by each of roadside devices within the scene to the cloud side.

3-2) The road restriction information may include, but is not limited to, allowable vehicle speed range, number of lanes, lane width, and available road sections, etc.

3-3) The specific form of the decision model may include, but is not limited to, a decision rule specified by using a fuzzy logic method based on expert rules and experience, a multi-agent decision training model based on reinforcement learning, and a time slot allocation model designed based on a game theory matching method, etc.

3-4) The specific contents of the decision planning schemes may include, but is not limited to, a driving priority distribution scheme, a vehicle path change scheme, and a vehicle next-state driving operation scheme, such as gear shifting, braking, and lane changing for all or a part of the vehicles within the scene. The scheme is not limited to any of the specific presentation form.

4) The decision planning schemes are distributed to the vehicles to provide cooperative decision suggestions for the vehicles.

In the process, the roadside device senses real-time traffic information of the road, and sends a cooperative decision request to the cloud side based on congestion situation of the road. The cloud side receives the cooperative decision request, makes a cooperative decision scene matching according to the road model, then obtains driving data of multiple vehicles, and uses a corresponding cooperative decision model to analyze to recognize multi-vehicle decision planning schemes, and finally distribute the decision planning schemes to the corresponding vehicles. This process can complete a unified decision planning in the cloud side based on driving data of multiple vehicles, and provide decision suggestions for all vehicles within the area, thereby reducing computing performance requirements on vehicles and roadside devices, while improving traffic flow efficiency and safety of intelligent connected vehicles, and thus it is suitable for a group decision-making scenario for intelligent connected vehicles.

Figure 3:
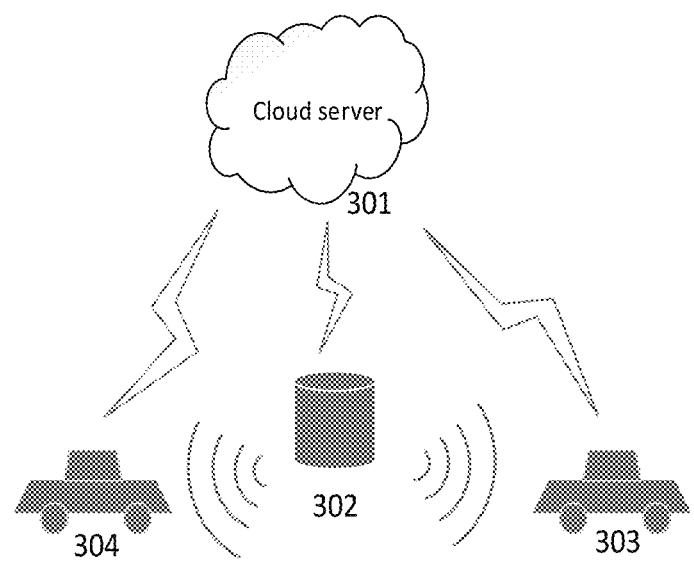
FIG. 3 is a schematic diagram of an example of a system architecture to which the method for vehicle cooperative decision-making according to an embodiment of the present application is applicable.

An example of a system architecture in which the method for vehicle cooperative decision-making according to the embodiments of the application can be applied is shown in FIG. 3. The system may include a cloud server 301, a roadside device 302, an intelligent connected vehicle 303 and an intelligent connected vehicle 304. The cloud server 301 may communicate with the roadside device 302 through a wired or wireless connection, and may communicate with the intelligent connected vehicle 303 and the intelligent connected vehicle 304 through a wired or wireless connection. The roadside device 302 can sense driving condition of the intelligent connected vehicles 303 and 304 via various sensors.

The cloud server includes one or more information transceiver devices, computing and processing devices, and storage devices, and each of the devices can communicate through a wired or wireless connection. The cloud server receives the cooperative request and information about vehicles sent by the roadside device, calculates a set of optimal decision planning schemes for all of the vehicles within the decision scene, and then provides decision suggestion services for each of the intelligent connected vehicles.

There may be multiple roadside devices in a road scene, and each roadside device may be provided with various sensors, information transceiver devices, as well as computing and processing devices, which can communicate with each other through a wired or wireless connection. The roadside device acquires driving conditions of all of vehicles within the area through various sensors, calculates a congestion coefficient for the area through the computing and processing device, and uses the information transceiver device to send a cooperative decision request to the cloud side based on the congestion coefficient.

Both the intelligent connected vehicle 303 and the intelligent connected vehicle 304 are equipped with an in-vehicle intelligent computer to transmit driving information such as vehicle speed and planned path of each of the vehicles to the cloud server, and to receive decision suggestions from the cloud server. The in-vehicle intelligent computer can also plan a driving decision planning scheme for the vehicle based on the information sense by the vehicle and the decision suggestions from the cloud server.

The number of intelligent connected vehicles and the number of roadside devices in the FIG. 3 are only illustrative, and there may be any number of intelligent connected vehicles and roadside devices according to implementation requirements.

Figure 4:
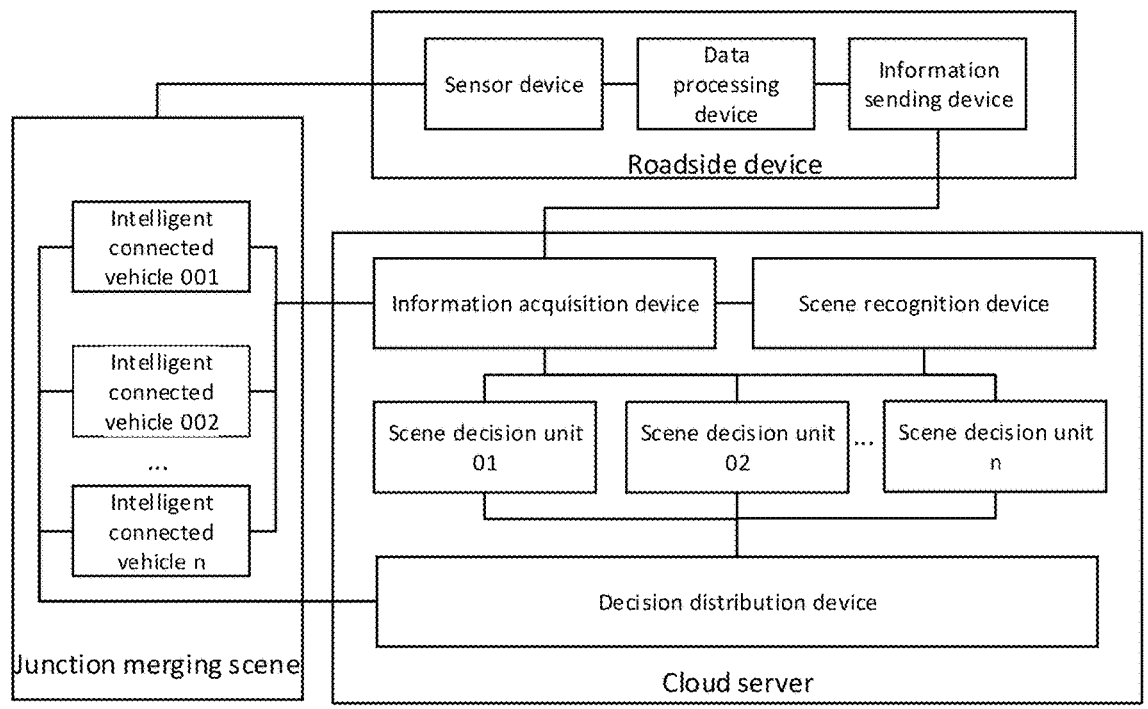
FIG. 4 is a schematic diagram of another example of a system architecture to which the method for vehicle cooperative decision-making according to an embodiment of the present application is applicable.

In one embodiment, another example of a system architecture in which the method for vehicle cooperative decision-making according to the embodiments of the present application can be applied is shown in FIG. 4. There are n intelligent connected vehicles in a junction merging scene; the roadside device includes a sensor device, a data processing device and an information sending device; and the cloud server includes an information acquisition device, a scene recognition device, n scene decision units, and a decision distribution device.

The technical solution above will be described with a specific embodiment below.

Step 1: The roadside device at a vehicle merging junction acquires real-time road information of a main road and a merging lane, recognizes a road congestion coefficient, and sends a cooperative request.

In the embodiment, the roadside device includes a sensor device, a data processing device, and an information sending device pre-installed on it. The sensor device may at least include sensors such as lidars and cameras to collect the number and locations of vehicles on the main road and the merging lane, and the data processing device recognizes a road congestion coefficient by calculating a density of vehicles in the road segment and an average driving speed of multiple vehicles.

The data processing device of the roadside device recognizes that the congestion coefficient reaches a preset threshold, and sends a cooperative request to the cloud server through the information sending device.

The information sending device may send the request to the cloud server through a wired connection or a wireless connection. The specific connection form includes, but is not limited to, a 3G or 4G or 5G connection, a WIFI connection, a cable connection or an optical cable connection, and any other wireless connection ways currently known or will be developed in the future.

Step 2: The cloud server receives the cooperative decision request, obtains first information of the scene to which the roadside device belongs, and performs decision calculation by a matched scene decision unit.

In the embodiment, the cloud server side includes an information acquisition device, a scene recognition device, a plurality of scene decision units suitable for different road scenes, and a decision distribution device.

In the embodiment, the information acquisition device can receive various types of information from the vehicles or the roadside device in a wired or wireless connection, and the information acquisition device receives, in response to the cooperative decision request received from the roadside device at the vehicle merging junction, the first information of the scene, and transmits it to the scene recognition device through a wired or wireless connection.

In the embodiment, the first information of the scene includes the number of lanes of the main road, longitude and latitude data of the roadside device, etc., which are obtained from the roadside device through a wired or wireless connection.

In the embodiment, the scene recognition device have a plurality of preset cooperative decision scene models and road network map models with road segment annotations stored therein, and the scene recognition device performs a matching with the preset scene models and the road network map models according to the first information of the scene to identify that the road scene is a cooperative decision model for junction merging scene, and then sends a decision calculation command to a scene decision unit that is suitable for processing cooperative decisions for junction merging scene through a wired or wireless connection.

Step 3: The scene decision unit acquires information required for decision-making in response to the decision calculation command, and analyzes to calculate multi-vehicle decision planning schemes.

In the embodiment, the scene decision unit communicates with the above-mentioned information acquisition device through a wired or wireless connection, and acquires required road restriction information and real-time vehicle data through the information acquisition device.

In the embodiment, the required road restriction information may include speed limit information on the main road, and speed limit information in the merging lane received from the roadside device through the information acquisition device; and the required real-time vehicle information may include real-time data such as vehicle planed path, driving speed, acceleration, angular velocity, etc. obtained by each of the vehicles within the sensing range of the roadside device through the information acquisition device.

In the embodiment, the scene decision unit may include a preset cooperative decision model suitable for an junction merging scene, analyzes the real-time vehicle information under a condition that the road restriction information is satisfied, and calculates multi-vehicle oriented decision planning schemes in the junction merging scene according to the cooperative decision model, and transmits the schemes to the decision distribution device.

In the embodiment, the multi-vehicle oriented decision planning schemes may include recommendations for driving behaviors such as acceleration, deceleration, braking, and lane change for each of the vehicles on the main road and the merging lane within the sensing range of the roadside device.

Step 4: The multi-vehicle oriented decision planning schemes are distributed to the corresponding vehicles to provide decision suggestions.

In the embodiment, the decision distribution device receives the decision planning schemes from the scene decision unit through a wired or wireless connection, and decomposes the decision planning schemes according to vehicle characteristics of decision flows in the schemes to form single-vehicle decision suggestions and distributes them to corresponding vehicles, so as to complete the multi-vehicle cooperative decision process in the junction merging scene.

Figure 5:
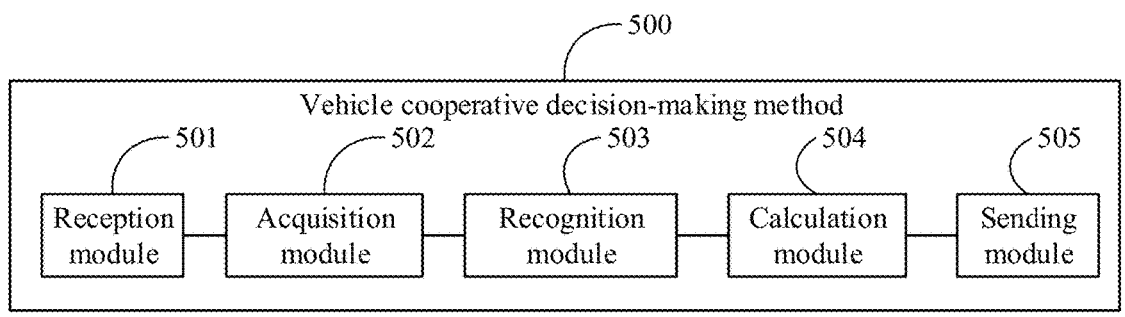
FIG. 5 is a schematic structural diagram of a device for vehicle cooperative decision-making according to an embodiment of the present application.

As shown in FIG. 5, the present application also provides a device for vehicle cooperative decision-making. The device 500 for determining a vehicle cooperative decision is applied at a cloud server and includes:

- a receiving module 501 configured to receive a cooperative decision request sent by a roadside device, wherein the cooperative decision request is a request sent by the roadside device after it is recognized that a road is congested based on acquired real-time road information;
- an acquisition module 502 configured to acquire information of a road scene included in the cooperative decision request;
- a recognition module 503 configured to recognize a congestion scene type based on the information of the road scene;
- a calculation module 504 configured to calculate multi-vehicle oriented decision planning schemes using a preset scene cooperative decision model based on the congestion scene type;
- a sending module 505 configured to send the decision planning schemes to respective vehicles, so that the vehicles perform respective driving operations according to the decision planning schemes.

In an embodiment, the calculation module 504 may include:

- an acquisition unit configured to acquire road restriction information and real-time vehicle state information corresponding to the congestion scene type; and
- a calculation unit configured to calculate the multi-vehicle oriented decision planning schemes using the preset scene cooperative decision model based on the road restriction information and the real-time vehicle state information.

In an embodiment, the acquiring unit may include:
- a first reception subunit configured to receive at least one of vehicle speed, acceleration, angular velocity, wheel steering, braking information, a relative distance to a leading/following vehicle, destination information, and a ratio of traveled path to planned path sent by each of the vehicle.

In an embodiment, the acquiring unit may include:
- a second reception subunit configured to receive at least one of traffic light state information, relative sequence information of the vehicles, and location information of a pedestrian in the road scene sent by the roadside device.

In an embodiment, the road restriction information comprises allowable vehicle speed range, number of lanes, lane width, and available road sections.

In an embodiment, the preset scene cooperative decision model is a time slot allocation model designed based on a game theory matching method.

In an embodiment, the decision planning schemes may include at least one of a driving priority distribution scheme, a vehicle path change scheme, and a vehicle next-state driving operation scheme.

The modules/units in the device shown in FIG. 5 have functions for implementing the steps in FIG. 1 and can achieve the same technical effects. For sake of brevity, they are not repeated here.

Figure 6:
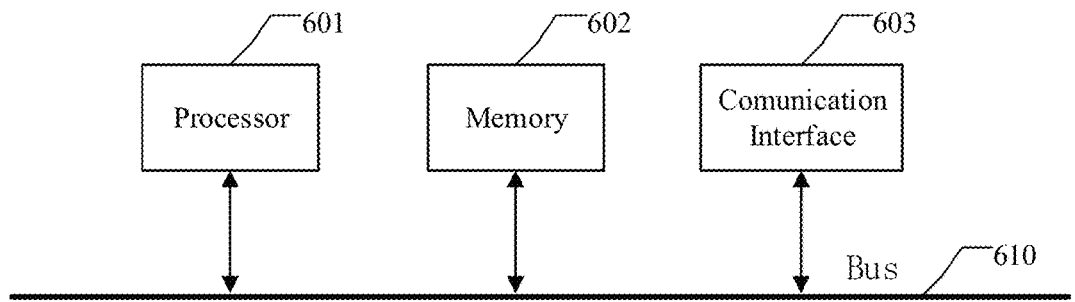
FIG. 6 is a schematic structural diagram of an electronic device according to an embodiment of the present application.

FIG. 6 shows a schematic structural diagram of an electronic device according to an embodiment of the present application.

The electronic device may include a processor 601 and a memory 602 storing computer program instructions.

Specifically, the processor 601 may include a central processing unit (CPU), or a specific integrated circuit (Application Specific Integrated Circuit, ASIC), or may be configured as one or more integrated circuits that implement the embodiments of the present application.

The memory 602 may include a mass storage for data or commands. By way of an example rather than limitation, the memory 602 may include a hard disk drive (Hard Disk Drive, HDD), a floppy disk drive, a flash memory, an optical disk, a magneto-optical disk, a magnetic tape, or a universal serial bus (Universal Serial Bus, USB) drive, or any combination of two or more of these devices. The memory 602 may include a removable or non-removable (or fixed) medium where appropriate. The memory 602 may be internal or external to the electronic device where appropriate. In particular embodiments, the memory 602 may be a nonvolatile solid-state memory.

In an example, the memory 602 may be a read-only memory (Read-Only Memory, ROM). In one example, the ROM may be mask-programmed ROM, programmable ROM (PROM), erasable PROM (EPROM), electrically erasable PROM (EEPROM), electrically rewritable ROM (EAROM), or flash memory or any combination of two or more of these devices.

The processor 601 reads and executes the computer program instructions stored in the memory 602 to implement any method for vehicle cooperative decision-making in the foregoing embodiments.

In an example, the electronic device may further include a communication interface 603 and a bus 610. A shown in FIG. 6, the processor 601, the memory 602, and the communication interface 603 are connected through the bus 610 and perform mutual communication.

The communication interface 603 is primarily used to implement communication between various modules, components, units and/or devices in the embodiments of the present application.

The bus 610 includes hardware, software, or the both, and couples components of electronic device to each other. By way of an example rather than limitation, the bus may include an Accelerated Graphics Port (AGP) or other graphics bus, an Enhanced Industry Standard Architecture (EISA) bus, a Front Side Bus (FSB), a Hypertransport (HT) interconnect, an Industry Standard Architecture (ISA) bus, an infinite bandwidth interconnection, a Low Pin Count (LPC) bus, a memory bus, a Micro Channel Architecture (MCA) bus, a Peripheral Component Interconnect (PCI) bus, a PCI-Express (PCI-X) bus, a Serial Advanced Technology Attachment (SATA) bus, a Video Electronics Standards Association Local (VLB) bus or any other suitable bus or a combination of two or more of these buses. The bus 610 may include one or more buses where appropriate. Although the embodiments of this application are described with a particular bus, the application may consider any suitable bus or interconnection.

In addition, the embodiments of the present application may provide a computer storage medium for implementation. The computer storage medium stores computer program instructions, and the computer program instructions are executed by the processor to implement any method for vehicle cooperative decision-making in the foregoing embodiments.

Examples of the computer storage medium may include a non-transitory computer-readable storage medium, such as a ROM, a random access memory (Random Access Memory, RAM), a magnetic disks, or an optical disk.

It should be clear that the present application is not limited to the specific configuration and processing described above and shown in the figures. For sake of brevity, a detailed description of any known method has been omitted here. In the above embodiments, several specific steps are described and shown as examples. However, the method process of the present application is not limited to the specific steps described and shown. After understanding the spirit of the present application, those skilled in the art can make various changes, modifications and additions, or change the sequence among the steps.

The functional modules shown in the above-mentioned structural block diagram can be implemented as hardware, software, firmware, or a combination thereof. When implemented as hardware, it can be, for example, an electronic circuit, an application specific integrated circuit (ASIC), appropriate firmware, a plug-in, a function card, and so on. When implemented as software, the elements of the application are programs or code segments used to perform required tasks. The programs or code segments may be stored in a machine-readable medium, or transmitted on a transmission medium or a communication link through a data signal carried in carrier waves. "Machine-readable medium" may include any medium that can store or transmit information. Examples of machine-readable media may include an electronic circuit, a semiconductor memory device, a ROM, a flash memory, an erasable ROM (EROM), a floppy disk, a CD-ROM, an optical disk, a hard disk, a fiber optic medium, a radio frequency (RF) link, and so on. The code segments may be downloaded via a computer network such as the Internet, an intranet, and so on.

It should also be noted that the exemplary embodiments mentioned in the application describe some methods or systems based on a series of steps or devices. However, the present application is not limited to the order of the steps above, that is, the steps may be executed in the order mentioned in the embodiments, or may be executed in a different order than the embodiments, or several steps may be executed simultaneously.

The above describes various aspects of the present application with reference to the flowcharts and/or block diagrams of the methods, devices (systems) and computer program products according to the embodiments of the present application. It should be understood that each block in the flowcharts and/or block diagrams and combinations of blocks in the flowcharts and/or block diagrams may be implemented by computer program instructions. These computer program instructions can be provided to a processor of a general-purpose computer, a special-purpose computer, or any other programmable data processing device to produce a machine that enables the processor of the computer or any other programmable data processing device to execute the instructions to implement the functions/actions specified in one or more blocks of the flowcharts and/or block diagrams. Such a processor may be, but is not limited to, a general-purpose processor, a dedicated processor, a special application processor, or a field programmable logic circuit. It should also be understood that each block in the block diagram and/or flowchart and the combination of the blocks in the block diagram and/or flowchart may also be implemented by dedicated hardware that performs the specified functions or actions, or may be implemented by a combination of dedicated hardware and computer instructions.

The descriptions above are only specific implementations of the present application, and those skilled in the art can clearly understand that for convenience and conciseness of description, the specific working process of the above-described systems, modules and units may refer to the foregoing method embodiments, and is not repeated here. It should be understood that the scope of the application is not limited to the embodiments, and those skilled in the art can easily anticipate various equivalent modifications or substitutions within the technical scope of the application, and all of these modifications or substitutions fall within the scope of the present application.

What is claimed is:

1. A method for vehicle cooperative decision-making, applied at a cloud server and comprising:
   receiving a cooperative decision request sent by a roadside device, wherein the cooperative decision request is a request sent by the roadside device after it is recognized that a road is congested based on acquired real-time road information;
   acquiring information of a road scene included in the cooperative decision request;
   determining a congestion scene type based on the information of the road scene and identifying one of a plurality of preset scene cooperative decision models based on the congestion scene type;
   calculating multi-vehicle oriented decision planning schemes using the identified preset scene cooperative decision model; and
   sending the decision planning schemes to respective vehicles on the road, so that the vehicles perform respective driving operations according to the decision planning schemes.

2. The method for vehicle cooperative decision-making according to claim 1, wherein the calculation of the multi-vehicle oriented decision planning schemes using the identified preset scene cooperative decision model comprises:
   acquiring road restriction information and real-time vehicle state information corresponding to the congestion scene type; and
   calculating the multi-vehicle oriented decision planning schemes using the identified preset scene cooperative decision model based on the road restriction information and the real-time vehicle state information.

3. The method for vehicle cooperative decision-making according to claim 2, wherein the acquisition of the real-time vehicle state information comprises:
   receiving at least one of vehicle speed, acceleration, angular velocity, wheel steering, braking information, a relative distance to a leading/following vehicle, destination information, and a ratio of traveled path to planned path sent by each of the vehicles.

4. The method for vehicle cooperative decision-making according to claim 2, wherein the acquisition of the real-time vehicle state information comprises:
   receiving at least one of traffic light state information, relative sequence information of the vehicles, and location information of a pedestrian in the road scene sent by the roadside device.

5. The method for vehicle cooperative decision-making according to claim 2, wherein the road restriction information comprises at least one of: allowable vehicle speed range, number of lanes, lane width, and available road sections.

6. The method for vehicle cooperative decision-making according to claim 1, wherein the preset scene cooperative decision model is a time slot allocation model designed based on a game theory matching method.

7. The method for vehicle cooperative decision-making according to claim 1, wherein the decision planning schemes comprise at least one of a driving priority distribution scheme, a vehicle path change scheme, and a vehicle next-state driving operation scheme.

8. An electronic device, comprising:
a processor; and
a memory storing computer program instructions,
wherein the processor is configured to execute the computer program instructions to perform the method for vehicle cooperative decision-making according to claim 1.

9. A computer storage medium having computer program instructions stored thereof, wherein the computer program instructions, when executed by a processor, cause the processor to perform the method for vehicle cooperative decision-making according to claim 1.

10. A device for vehicle cooperative decision-making, applied at a cloud server and comprising:
a reception module configured to receive a cooperative decision request sent by a roadside device, wherein the cooperative decision request is a request sent by the roadside device after it is recognized that a road is congested based on acquired real-time road information;
an acquisition module configured to acquire information of a road scene included in the cooperative decision request;
a recognition module configured to recognize a congestion scene type based on the information of the road scene and identify one of a plurality of preset scene cooperative decision models based on the congestion scene type;
a calculation module configured to calculate multi-vehicle oriented decision planning schemes using the identified preset scene cooperative decision model; and
a sending module configured to send the decision planning schemes to respective vehicles on the road, so that the vehicles perform respective driving operations according to the decision planning schemes.

11. The device for vehicle cooperative decision-making according to claim 10, wherein the calculation module comprises:
an acquisition unit configured to acquire road restriction information and real-time vehicle state information corresponding to the congestion scene type; and
a calculation unit configured to calculate the multi-vehicle oriented decision planning schemes using the identified preset scene cooperative decision model based on the road restriction information and the real-time vehicle state information.

12. The device for vehicle cooperative decision-making according to claim 11, wherein the acquisition unit comprises:
a first reception subunit configured to receive at least one of vehicle speed, acceleration, angular velocity, wheel steering, braking information, a relative distance to a leading/following vehicle, destination information, and a ratio of traveled path to planned path sent by each of the vehicle.

13. The device for vehicle cooperative decision-making according to claim 11, wherein the acquisition unit comprises:
a second reception subunit configured to receive at least one of traffic light state information, relative sequence information of the vehicles, and location information of a pedestrian in the road scene sent by the roadside device.

14. The device for vehicle cooperative decision-making according to claim 11, wherein the road restriction information comprises at least one of: allowable vehicle speed range, number of lanes, lane width, and available road sections.

15. The device for vehicle cooperative decision-making according to claim 10, wherein the preset scene cooperative decision model is a time slot allocation model designed based on a game theory matching method.

16. The device for vehicle cooperative decision-making according to claim 10, wherein the decision planning schemes comprise at least one of a driving priority distribution scheme, a vehicle path change scheme, and a vehicle next-state driving operation scheme.

* * * * *